US009652812B2

(12) United States Patent
Gocek et al.

(10) Patent No.: US 9,652,812 B2
(45) Date of Patent: May 16, 2017

(54) OBTAINING SOFTWARE ASSET INSIGHT BY ANALYZING COLLECTED METRICS USING ANALYTIC SERVICES

(71) Applicant: International Business Machines Corporation, Armonk, NY (US)

(72) Inventors: Pawel K. Gocek, Lodz (PL); Piotr Kania, Cracow (PL); Bartlomiej T. Malecki, Slomniki (PL); Michal S. Paluch, Cracow (PL); Tomasz A. Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 14/321,176

(22) Filed: Jul. 1, 2014

(65) Prior Publication Data

US 2016/0006600 A1    Jan. 7, 2016

(51) Int. Cl.
*G06F 17/30* (2006.01)
*G06Q 50/18* (2012.01)
*G06F 21/10* (2013.01)
*H04L 12/26* (2006.01)
*H04L 12/24* (2006.01)
*H04L 29/08* (2006.01)

(52) U.S. Cl.
CPC ..... *G06Q 50/184* (2013.01); *G06F 17/30545* (2013.01); *G06F 17/30867* (2013.01); *G06F 21/105* (2013.01); *H04L 41/0286* (2013.01); *H04L 43/06* (2013.01); *H04L 43/08* (2013.01); *H04L 43/14* (2013.01); *H04L 67/22* (2013.01); *G06F 2221/2101* (2013.01); *G06Q 2220/18* (2013.01)

(58) Field of Classification Search
USPC ................................. 707/770, 736
See application file for complete search history.

(56) References Cited

U.S. PATENT DOCUMENTS 7,840,490 B1    11/2010    Sellers et al.
8,055,530 B2    11/2011    Cao et al.
(Continued)

OTHER PUBLICATIONS

IBM, List of IBM Patents or Patent Applications Treated as Related, Dated Aug. 22, 2014, 2 pages.
(Continued)

*Primary Examiner* — Debbie Le
(74) *Attorney, Agent, or Firm* — Nicholas D. Bowman

(57) ABSTRACT

A plurality of software instances deployed in a monitored environment are discovered by a software asset management tool operated by a software asset administrator who is responsible for monitoring software license compliance within the monitored environment. The software asset management tool then collects metrics associated with the plurality of software instances. The collected metrics are then provided to a first analytic service adapted to generate analytic information about the plurality of software instances. Using at least the collected metrics, the analytic service generates analytic information. The analytic information is then obtained from the analytic service. By reviewing the analytic information, the software asset administrator is able to obtain additional insight into the monitored environment that would not otherwise be available to him.

8 Claims, 7 Drawing Sheets

(56) References Cited

U.S. PATENT DOCUMENTS

| | | | | |
|---|---|---|---|---|
| 8,100,311 | B2* | 1/2012 | Ostersehlte | B23K 20/123 228/112.1 |
| 8,321,288 | B1 | 11/2012 | Rodriguez et al. | |
| 8,321,352 | B1 | 11/2012 | Rameshkumar et al. | |
| 8,380,837 | B2 | 2/2013 | Dawson et al. | |
| 8,407,669 | B2 | 3/2013 | Yee et al. | |
| 8,408,669 | B2* | 4/2013 | Rueby | B41J 2/2132 347/14 |
| 8,538,889 | B2 | 9/2013 | Bhave et al. | |
| 9,311,211 | B2* | 4/2016 | Chatterjee | G06F 11/3409 |
| 2009/0037337 | A1 | 2/2009 | Baitalmal et al. | |
| 2010/0106678 | A1 | 4/2010 | Pietrek et al. | |
| 2011/0131134 | A1* | 6/2011 | Ferris | G06F 21/10 705/40 |
| 2011/0131315 | A1* | 6/2011 | Ferris | G06F 21/105 709/224 |
| 2012/0290708 | A1 | 11/2012 | Siemsgluess | |
| 2012/0304248 | A1 | 11/2012 | Watts et al. | |
| 2013/0086249 | A1 | 4/2013 | White et al. | |
| 2013/0144742 | A1 | 6/2013 | Thakur et al. | |
| 2013/0159238 | A1 | 6/2013 | Borkowski et al. | |
| 2016/0004848 | A1 | 1/2016 | Gocek et al. | |

OTHER PUBLICATIONS

Gocek et al., "Obtaining Software Asset Insight by Analyzing Collected Metrics Using Analytic Services", U.S. Appl. No. 15/155,127, filed May 16, 2016.

IBM, "List of IBM Patents or Patent Applications Treated as Related", May 12, 2016, 2 pages.

Mell et al., "The NIST Definition of Cloud Computing", Recommendations of the National Institute of Standards and Technology, U.S. Department of Commerce, Special Publication 800-145, Sep. 2011, 7 pages.

Gocek, P. et al., "Obtaining Software Asset Insight by Analyzing Collected Metrics Using Analytic Services," U.S. Appl. No. 14/468,669, filed Aug. 26, 2014.

IBM, "List of IBM Patents or Patent Applications Treated as Related.".

Anonymous, "System and Method for Software Purchase Planning," IP.com No. IPCOM000212361D IP.com Electronic Publication: Nov. 8, 2011, http://ip.com/IPCOM/000212361.

API, "Weather API: Introduction," http://www.wunderground.com/weather/api/d/docs#radar (last accessed Apr. 22, 2014 at 3:09 PM).

API, http://api.wunderground.com/api/THE_KEY/conditions/q/CA/THE_T . . . (last accessed Apr. 22, 2014 3:10 PM).

IBM, "Licensing of pricing models with flexible characteristics," Original Publication Date: Nov. 14, 2006 IP.com No. IPCOM000143165D, IP.com Electronic Publication: Nov. 14, 2006, http://ip.com/IPCOM/000143165.

IBM, "Association recomputation for updated licenses," Original Publication Date: Jan. 30, 2008 IP.com No. IPCOM000167080D, IP.com Electronic Publication: Jan. 30, 2008, http://ip.com/IPCOM/000167080.

Springer, "Pricing Strategies of Software Vendors," Business & Information Systems Engineering, Dec. 2009, vol. 1, Issue 6, pp. 452-462, © Springer, Part of Springer Science+Business Media, http://rd.springer.com/article/10.1007/s12599-009-0075-y (last accessed Apr. 23, 2014 11:31 AM).

* cited by examiner

OBTAINING SOFTWARE ASSET INSIGHT BY ANALYZING COLLECTED METRICS USING ANALYTIC SERVICES

BACKGROUND

The present disclosure relates to software analysis, and more specifically, to providing metrics collected by software asset management tools to analytic services in order to obtain from these analytic services specific analytic information about software instances.

Software asset management tools are becoming widely used in a variety of computing environments. As described herein, these tools refer to software programs (or sets of software programs) that discover and collect information about software instances deployed in monitored environments. In some embodiments, such a tool may be used by an entity's asset administrator to collect metrics (i.e., measures of properties) about software instances for one or more purposes relating to that entity's financial, regulatory, or licensing requirements. These requirements may incorporate several tasks relating to software license compliance monitoring (e.g., ensuring that all software instances are licensed and metering these software instances to determine the applicable fees that are due to licensors). Furthermore, as software owners continue to shift toward complex software licensing schemes, software asset management tools may continue to play increasingly significant roles.

SUMMARY

According to embodiments of the present disclosure, aspects of the disclosure may include a method, a system, and a computer program product. The method, system, and computer program product may include discovering a plurality of software instances deployed in a monitored environment. Metrics associated with the plurality of software instances may be collected. The collected metrics may then be provided to a first analytic service adapted to generate analytic information about the plurality software instances by using at least the collected metrics. The analytic information may then be obtained from the first analytic service.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
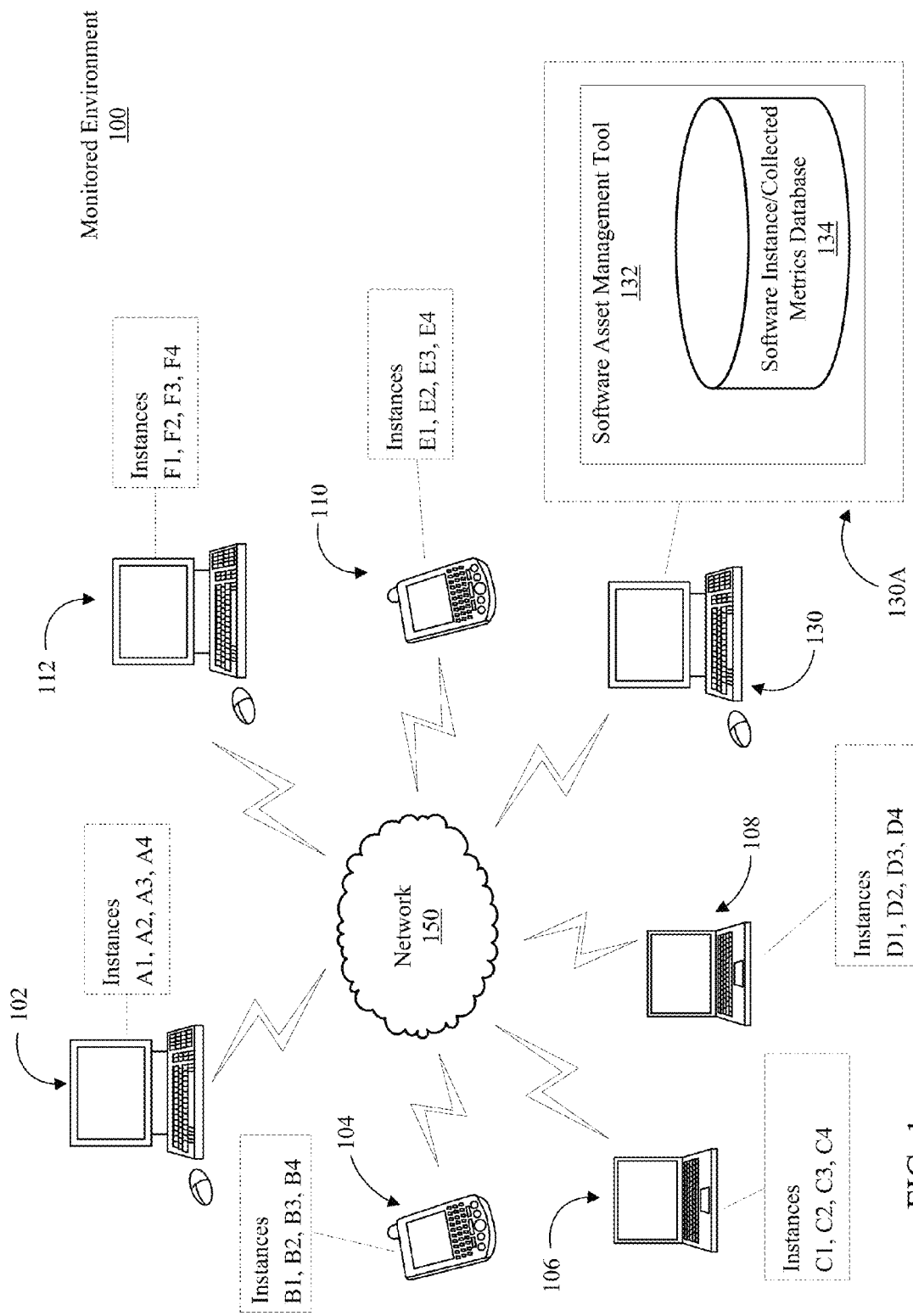
FIG. 1 illustrates a high-level diagram of an example monitored environment, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to software analysis, and more specifically, to providing metrics collected by software asset management tools to an analytic service in order to obtain from the analytic service specific analytic information about software instances. While the present disclosure is not necessarily limited to such applications (for example, in some embodiments, no software asset management tool may be needed in situations where other metric collection means are available), various aspects of the disclosure may be appreciated through a discussion of various examples using this context.

During the course of performing tasks relating to software license compliance monitoring, a software asset management tool may obtain significant amounts of high-quality metrics about the software instances discovered in a monitored environment. In many cases, the use of these metrics may be limited to the purposes for which the metrics are collected, or, similarly, the use of these metrics may be limited to generating only that analytic information which the software asset management tool itself is adapted to generate (e.g., only licensing compliance analytic information). In some situations, this limited use of a software asset management tool (and the metrics it collects) may constitute an unsuitable waste of resources. This may be especially true in dynamic or complex environments, such as cloud computing environments, where new virtual machines hosting new software instances may be commissioned and decommissioned quickly and automatically. Indeed, in such environments the software asset management tool may be the only program that can feasibly obtain these up-to-date software instance metrics.

In some embodiments of the present disclosure, a software asset management tool may be used to perform at least two types of tasks. First, it may be used to collect metrics about software instances within a monitored environment and to provide certain analytic information (e.g., relating to license compliance), based on these collected metrics, to an asset administrator. The second type of task that the software asset management tool may perform is to collect metrics about software instances within the monitored environment and provide these collected metrics to an analytic service, which in turn provides certain analytic information to the asset administrator. These two types of tasks may be similar in that they both may involve the software asset management tool collecting metrics that are then used to generate analytic information for the asset administrator. However, these two types of tasks may also be different in that in the first type of tasks the software asset management tool may generate analytic information itself; while in the second type of task, the software asset management tool may collect metrics and then provide them to another program (i.e., an analytic service) that generates analytic information. For the second type of tasks, the software asset management tool may act as a service integrator, effectively binding software instances to a separate analytic service in order to allow the analytic service to provide useful analysis—analysis that the software asset management tool might not be able to provide when acting without the analytic service.

As noted previously, aspects of the present disclosure relate to better utilizing software asset management tools and the metrics they collect. Accordingly, a better understanding of the present disclosure may be aided by describing an example environment in which these tools may operate. Turning now to the figures, FIG. 1 illustrates a high-level diagram of an example monitored environment 100 including computers 102, 104, 106, 108, 110, 112, and 130 of the network 150. Within the monitored environment 100, software instances A1-F4 are dispersed over computers 102-112. In addition, an asset administrator may have a computer 130 that is also connected to network 150. It is contemplated that computers 102-112 and 130 may be any relevant computer systems or combination of computer systems including, for example, servers, desktops, laptops, mobile phones, smart phones, tablets, personal or enterprise digital assistants, and the like. In some embodiments, each the computers 102-112 and 130 may be embodied by a computer system/server 12 described below and shown in FIG. 5. Further, the seven computers 102-112 and 130 of FIG. 1 are shown for illustrative purposes only; it is contemplated that any number of computers may be used in some embodiments.

As shown in block 130A, the asset administrator's computer 130 may have a software asset management tool 132 that is designed to obtain and manage information about the dispersed software instances A1-F4. The information collected by software asset management tool 132 may be stored in software instance/collected metrics database 134. Consistent with some embodiments, there may be a plurality of software instances deployed within a given monitored environment 100. In addition, in some embodiments, relevant software instances may be deployed on computer 130 itself; in other embodiments, computer 130 may be remote from, or otherwise not included in, the monitored environment 100.

In some embodiments, the network 150 may be implemented by any number of any suitable communications media (e.g., wide area network (WAN), local area network (LAN), Internet, Intranet, etc.). Alternatively, the computers of network 150 may be local to each other, and communicate via any appropriate local communication medium (e.g., local area network (LAN), hardwire, wireless link, Intranet, etc.). In some embodiments, the network 150 may be implemented within a cloud computing environment, or using one or more cloud computing services. As discussed in more detail below, a cloud computing environment may include a network-based, distributed data processing system that provides one or more cloud computing services.

In some embodiments, monitored environment 100 may refer to only or mostly those computers that are owned or controlled by a single entity or the agents for whom that entity is responsible (e.g., employees, independent contractors, etc.). In some embodiments, the scope of monitored environment 100 may effectively be defined by that environment (e.g., group of computer systems or virtual machines, or both) over which an applicable entity has software management or software licensing responsibilities.

As shown in block 130A, the software instance/collected metrics database 134 may store metrics about the applicable software instances dispersed (i.e., deployed on different computers) throughout the network 150. For example, as shown in the pictured embodiment, the database 134 may include information about twenty-four software instances (A1-F4). Further, in some embodiments, it is contemplated that two or more different software instances on the same network or even on the same computer within a network may be of the same type or identical (e.g., A1, B3, and C4 may all be the same type of database program, B1 and D4 may be the same type of word processing program, etc.). Using the software asset management tool 132, an asset administrator may be equipped to make well-informed decisions about software management within the monitored environment 100.

In some embodiments of the present disclosure, one or more analytic services may be used in order to provide additional insights (i.e., analytic information beyond that which may be provided by other analytic tools) related to the software instances deployed in a monitored environment, such as the monitored environment 100 of FIG. 1. As used herein, an analytic service may refer to a program (or set of programs) that is both (1) adapted to use metrics to provide analytic information about software instances in a monitored environment and (2) not itself adapted for collecting metrics within the monitored environment. In some embodiments, the analytic service may be a program created by a third-party vendor and designed to provide useful information about the functioning of groupings of software instances (e.g., whether most instances of a particular program are operating at their full capacity, whether a group of instances of different programs are providing conflicting data to a server, etc.). Further, in some embodiments, the analytic service may be deployed within the monitored environment or even on the same computer as one or more tools which collect the relevant metrics from the monitored environment. In other embodiments, the analytic service may be remote from the monitored environment and/or any relevant metric collection tool (e.g., software asset management tool). Further, in some embodiments, the analytic service may obtain certain metrics from sources other than the monitored environment and may even include its own database of relevant metrics.

In some embodiments, the metrics obtained and used by analytics services may include metrics of several different types including, for example, software metrics, hardware metrics, and context metrics. As used herein, software metrics may refer to metrics about the usage of software (number of actual users, number of authorized user, total number of licenses, number of end points where it is used, etc.). Likewise, as used herein, hardware metrics may refer to a wide variety of metrics about hardware, including, for example, number and type of processors, amount of memory, available storage volume, virtualization topology, machine lifespans, etc. Further, as used herein, context metrics may refer to metrics that are relevant to a given analysis by an analytic service, but which may not be obtained directly from a monitored environment. For example, if an analytic service is providing information about ideal electricity usage by machines running a particular software within a monitored environment, it may require as a context metric the average usage of electricity by other companies in a given industry that also run this particular software.

Figure 2:
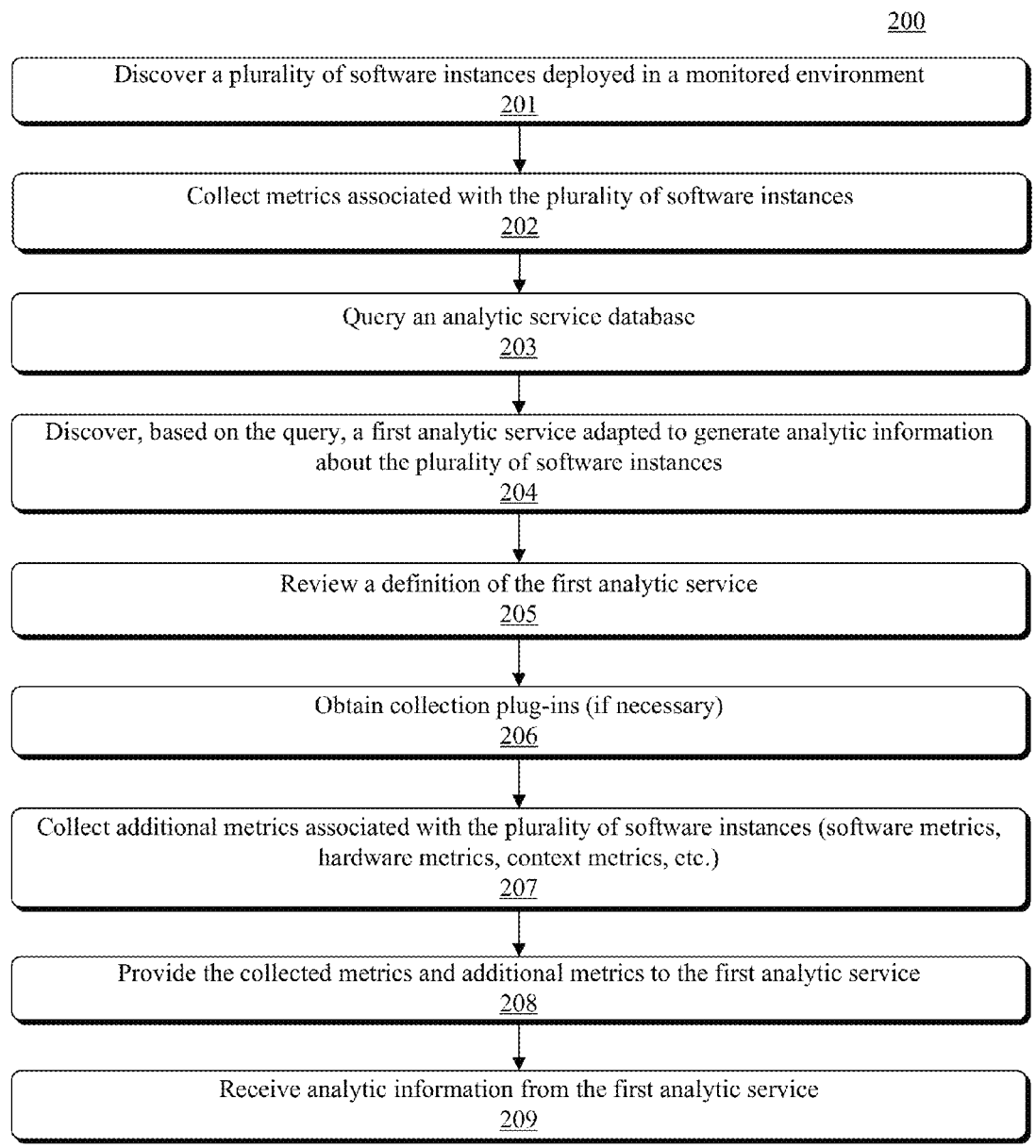
FIG. 2 illustrates a flowchart of a method of obtaining and using an analytic service in conjunction with a software asset management tool, in accordance with embodiments of the present disclosure.

Turning now to FIG. 2, shown is flowchart of a method 200 of obtaining and using an analytic service in conjunction with a software asset management tool. In some embodiments, this method may be performed by an asset administrator using various software modules (e.g., a software asset management tool). In other embodiments, the method may be performed by an interested individual other than an asset administrator (e.g., the CEO of a software licensee, a salesman for a software licensor, etc.) or may be performed automatically by one or more computers, without human user interaction.

The method 200 begins at block 201 wherein a plurality of software instances deployed in a monitored environment are discovered. The monitored environment could include, for example, monitored environment 100 of FIG. 1, and the discovery could be made, for example, by software asset management tool 132, also of FIG. 1. Next, per block 202, metrics associated with the plurality of software instances may be collected. As used herein, metrics associated with a software instance may include any metrics that relate to the performance, quality, or general use of the software instance. In some embodiments, these metrics may include a wide variety of software and hardware metrics. Furthermore, in addition to their use in method 200, these metrics may be used by the collecting agent (e.g., software management tool 132 of FIG. 1) for a wide variety of purposes. For example, the metrics may be used for generating license compliance analytic information or may instead (or in addition) be provided to a remote analytic service (e.g., an analytic service that was associated with the applicable software management tool prior to beginning method 200).

Per block 203, a query may be made in an analytic service database for an analytic service. In some embodiments, this query may be done by a computer automatically or it may be done in response to an input by an asset administrator (or other individual, as the case may be). Such an input may occur, for example, in situations where the asset administrator determines that he needs more information about a particular software product or how a particular software product is running within a monitored environment. Under these circumstances the asset administrator may need to seek an additional source of analytic information not currently available to him. The analytic service database itself may include a simple listing of analytic services and information on how to access them. The database may also include more detailed information about the analytic services. In some embodiments, a query of an analytic service database may be sorted or limited based on the software instances that are known to be deployed in the relevant monitored environment or may be sorted or limited based on the metrics that have already been collected. This sorting may aid the user in determining quickly which analytic services are likely to be useful in analyzing the relevant monitored environment. Furthermore, it is contemplated that in some embodiments an analytic service database may be an abstract repository of information. This abstraction may be an integrated linking between analytic services (e.g., via OSLC), rather than a mere collection of related analytic services at one location.

Per block 204, a first analytic service adapted to generate analytic information about the plurality of software instances may be discovered based on the query. More specifically, in some embodiments, the analytic service may be said to be configured to generate specific analytic information. The definition of the analytic service may be reviewed, per block 205. As used herein, a definition may refer to any information about a given analytic service that includes at least a listing of the metrics used by the given analytic service to generate the relevant analytic information. In some embodiments, the definition may be included in the information provided in the analytic service database; in other embodiments, all or part of the definition may need to be obtained from another source.

Per block 206, based on the review of the definition, the asset administrator may obtain collection plug-ins, if any are determined to be necessary. As used herein, a collection plug-in may refer to a software component that is both (1) designed to be added to an existing program (or set of programs) adapted for collecting metrics (e.g., a software asset management tool) and (2) configured, once added to the existing program, to enable that existing program to collect metrics which it was previously unable to collect. After obtaining an additional plug-in, a software asset management tool may be able to collect new types of metrics. In some embodiments, detailed definitions of the first analytic service either provide the necessary collection plug-ins or provide instructions on how to obtain these collection plug-ins. In some embodiments, the computer of an asset administrator may be able to determine what additional collection plug-ins are necessary based on the definition of the first analytic service. This may occur, for example, when the asset administrator's computer makes a comparison between the metrics that the software asset management tool has collected or is programmed to be able to collect and the metrics that the software asset management tool is not currently capable of collecting (e.g., metrics that can only be obtained from a third-party, etc.).

Next, per block 207, additional metrics associated with the plurality of software instances may be collected. As used herein, additional metrics may refer to those metrics that are not identical (or at least not substantially identical) to the metrics collected prior to reviewing the definition of the given analytic service. For example, if the number of instances of a given software asset is already being continuously collected, then an additional metric might be the average running time of these instances. In some embodiments, some of these additional metrics may be collected using the plug-ins obtained in block 206, while other additional metrics may be obtained using features that the software asset management tool may already be adapted to utilize. These additional metrics may include software, hardware, or context metrics.

Furthermore, in some embodiments, the timing as to when metrics are collected may not be critical. For example, all or a portion of the collected metrics used by a particular analytic service may be obtained (e.g., by a software asset management tool) before the analytic service is even identified or before the definition of the analytic service is reviewed. Likewise, in other embodiments, all or a portion of these collected metrics may be obtained subsequent to the analytic service's identification.

Per block 208, the collected metrics and the additional metrics may be provided to the first analytic service. In some embodiments, the first analytic service may then use these provided metrics to generate analytic information about the plurality of software instances. As used herein, analytic information may refer to information (e.g., insight) that is gained by analyzing metrics. Per block 209, the analytic information may be received by the computer of the asset administrator, from the first analytic service. Based on the analytic information provided, the asset administrator may be able to make determinations about the relevant software instances (e.g., whether they are running properly).

Figure 3:
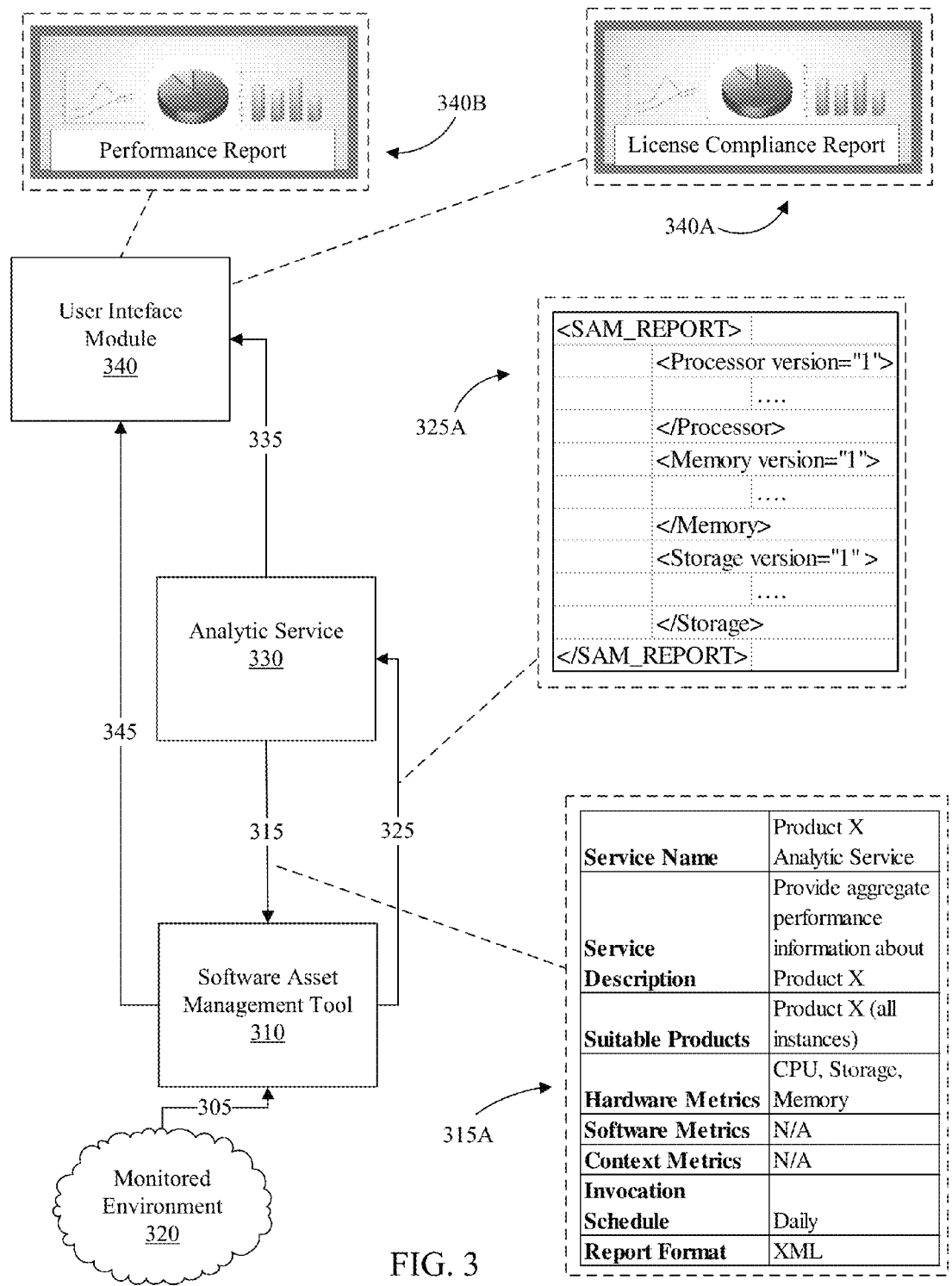
FIG. 3 illustrates a diagrammatic example of a software asset management tool that may both provide collected metrics to an analytic service and provide analytic information directly to a user interface module, in accordance with embodiments of the present disclosure.

Turning now to FIG. 3, shown is a diagrammatic example of a software asset management tool 310 that may both provide collected metrics to an analytic service 330 and provide analytic information directly to a user interface module 340. In this illustrated embodiment, the software asset management tool 310 and the analytic service 330 may be adapted to generate differing analytic information about instances of the same software program (Product X) within a monitored environment 320. More specifically, software management tool 310 may be adapted to generate Product X license compliance analytic information, and analytic service 330 may be adapted to generate performance analytic information (i.e., analytic information about the effectiveness of performance) about Product X. It is contemplated, however, that in some embodiments, software asset management tools may be able to collect simultaneously wide varieties of metrics about multiple software instances of different types; likewise, both software asset management tools and analytic services may be able to generate wide varieties of analytic information about different combinations of software instances.

In the illustrated embodiment, per interaction 315, the analytic service 330 may provide the software asset management tool 310 with instructions for the metrics that need to be obtained in order for it to be able to provide performance analytic information about Product X. These instructions (or for that matter, any information communicated via the interactions of FIG. 3) may be provided to software asset management tool 310 via any acceptable manner of communication. In some embodiments, an OSLC domain specific language may be used. In some embodiments, standard communication protocols (e.g., REST, SOAP, JSON, etc.) may allow the interaction 315 to proceed. An example of the instructions that may be provided to software asset management tool 310 are show in block 315A. As shown, the instructions may take the form of a definition.

In this example, the analytic service 330 is identified in its definition as "Product X Analytic Service" and the definition explains that it is adapted to provide an asset administrator with aggregate performance analytic information about the software instances of Product X that are deployed in a monitored environment during a given time frame. The definition further indicates that the analytic service requires three types of hardware metrics (shown in the figure in shorthand as CPU, Storage, and Memory) for the software instances of Product X in order to generate the analytic information. The definition further provides that the analytic service is to be invoked daily and that the required metrics obtained by the software asset management tool 310 should be provided to the analytic service 330 in an XML format.

It is noted that while the definition provided in block 315A is shown in a simplified spreadsheet format, it is contemplated that in some embodiments definitions may be provided in more detailed forms and may be in machine readable languages. These features may facilitate interaction 315 (or other interactions within embodiments) and may allow it to occur automatically without user intervention.

Next, per interaction 305, the software asset management tool 310 may collect two sets of metrics from the monitored environment 320; these metric sets may include the metrics requested by analytic service 330 (in this case, specific hardware metrics about instances of Product X) and the metrics that the software asset management tool 310 itself requires to provide its license compliance analytic information (e.g., number of users of Product X, etc.). In some embodiments, this collection process may effectively bind both the software asset management tool 310 and the analytic service 330 to each instance of Product X.

At a first scheduled time, the software asset management tool 310 may provide the requested collected metrics to analytic service 330 via interaction 325. An example report in XML format is shown in block 325A. Next, the analytic service 330 may compile and analyze the provided metrics. Based on the analysis, and per interaction 335, the analytic service 330 may generate the performance analytic information about Product X and provide this performance analytic information to user interface module 340. The performance analytic information may then be provided to the asset administrator in any acceptable form. For example, per block 340B, the performance analytic information may be shown in a series of graphs or charts tracking the performance of Product X over time within the monitored environment 320.

Similarly, at a second scheduled time, the software asset management tool 310 may itself analyze a second set of collected metrics, this time without accessing any remote analytic service. Based on this analysis, and per interaction 345, the software asset management tool 310 may generate license compliance analytic information about Product X and provide the information directly to user interface module 340. This information may be provided to the asset administrator in any acceptable form. For example, per block 340A, the license compliance analytic information may be presented in charts, diagrams, or other user-friendly forms.

In some embodiments, the asset administrator may be able to use and analyze the license compliance analytic information (provided by software asset management tool 310) and performance analytic information (provided by analytic service 330) either in conjunction with each other or separately. Based on this information, the software asset administrator may then be able to make well-informed decisions about a company's use of Product X. In some situations, these decisions may be improved in situations where the asset administrator has access to both sets of analytic information. For example, using the license compliance analytic information alone, the asset administrator may learn that the Product X is costing the company 20% more than what had been previously expected. If no more analytic information were reviewed, the asset administrator might conclude that the company's license for Product X should not be renewed next quarter. However, by also reviewing the performance analytic information, the asset administrator may also discover that Product X is performing 75% better than expected. Based on this larger set of information, the asset administrator may determine that the added cost is worth the price because of the added performance benefits. This is just one example of the insights that may be gained by using an analytic service in conjunction with a software asset management tool.

Figure 4:
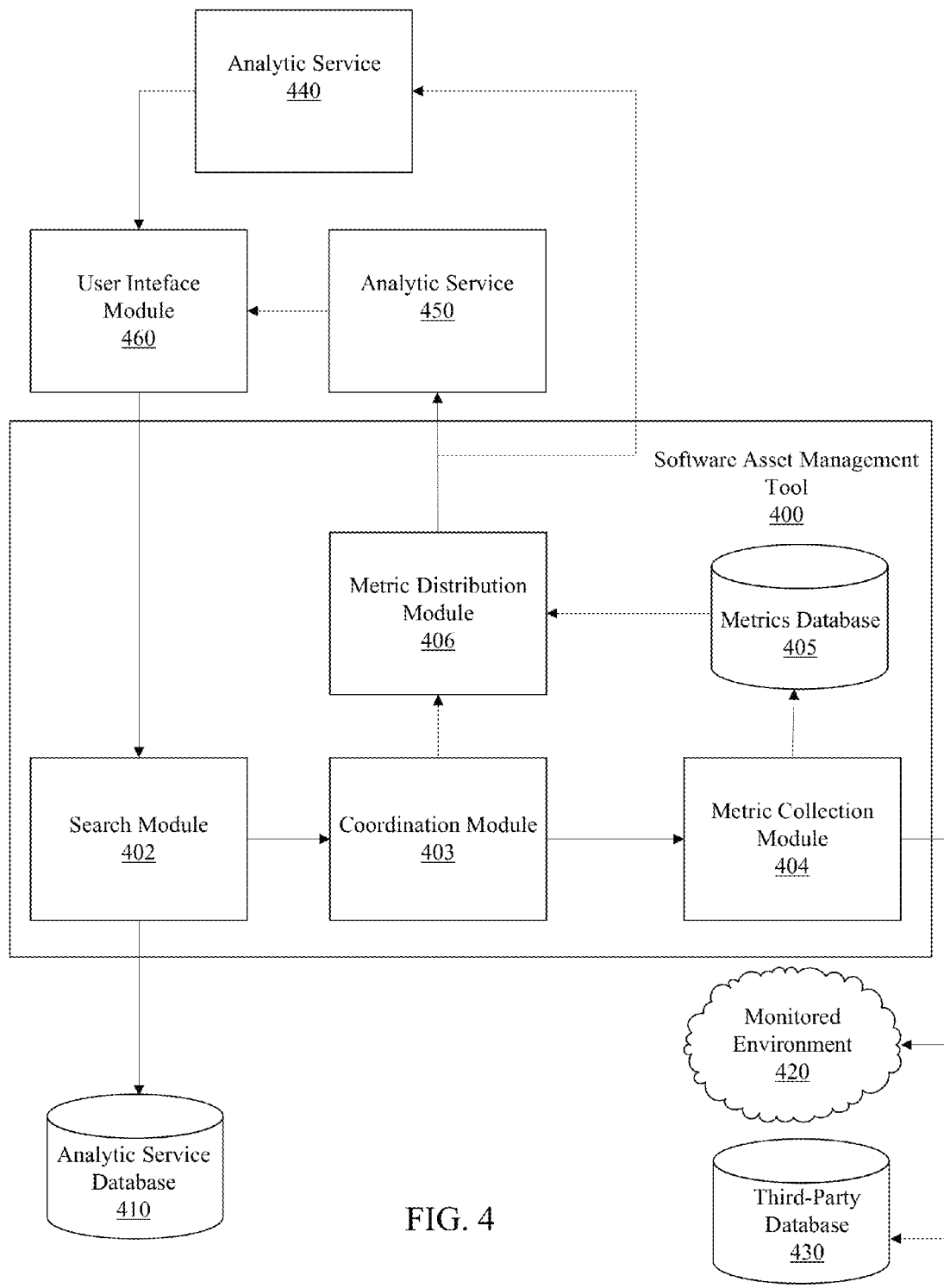
FIG. 4 illustrates a diagram of another example software asset management tool, this time used in conjunction with multiple analytic services, in accordance with embodiments of the present disclosure.

FIG. 4 depicts a diagram of another example software asset management tool 400, this time used in conjunction with multiple analytic services 440 and 450. In the illustrated embodiment, a user interface module 460 is shown as separate from the software asset management tool 400. This may not always be the case; for example, in some embodiments the user interface module 460 and software asset management tool 400 may be integrated. In addition, even in situations where they are not integrated, the user interface module 460 may be used on the same device as the software asset management tool 400 (e.g., where both are deployed on the computer of an asset administrator).

In some embodiments, the user interface module 460 may communicate with a search module 402 of the software asset management tool 400. During the communication, the user interface module 460 may provide the search module 402 with instructions to find a specific analytic service or a specific type of analytic service. Based on these instructions, the search module 402 may perform a search and obtain information about various analytic services via analytic service database 410. This information may include, for example, a listing of analytic services and their definitions. In the illustrated embodiment, search module 402 may locate analytic services 440 and 450, which may meet the search criteria provided in the instructions from the user interface module 460. In some embodiments, many analytic services may be used contemporaneously. These analytic services may provide analysis on the same or different software instances, either individually or in aggregate.

Next, coordination module 403 may be used to coordinate metric collection and distribution based on the definitions of, or other information about, specific analytic services obtained by search module 402. Based on instructions from the coordination module 403, a metric collection module 404 may search for the designated types of software instances and collect the requested metrics. In some embodiments, metric collection module 404 may collect metrics both from a monitored environment 420 and other sources, such as third party database 430. Third-party database 430 may be used in situations where context metrics or other metrics are needed in order to use a particular analytic service, but these metrics are not available within the monitored environment 420. In some embodiments, third-party database 430 may include Linked Data. For example, this may occur in situations where the third-party database 430 acts as a data integrator serving to connect metric collection module 404 to remote sources of data that are published in standardized formats which make them widely accessible. Furthermore, it is contemplated that in some embodiments, metrics collected from outside the monitored environment may not always (or may not just) be collected from databases; for example, in some embodiments, a given metric may be collected directly from a source that produces it, rather than from a repository where that metric is stored.

The information collected by metric collection module 404 may be stored in a metrics database 405 until it is needed. In some embodiments, a software asset management tool 400 may not include a metrics database 405; this may occur, for example, in situations where metrics are only collected for specific analytic services on an as needed basis. A metric distribution module 406 may receive instructions from the coordination module 403 indicating which analytic services to use and when to distribute metrics to these services. Based on these instructions, and at predetermined intervals (e.g., hourly, daily, etc.), metric distribution module 406 may obtain metrics from metrics database 405 and provide them to an analytic service. In the illustrated embodiment, the two analytic services 440 and 450 may be provided the metrics that each requires by metric distribution module 406 in the designated formats and at the designated times. Based on the metrics provided, analytics services 440 and 450 may generate analytic information and provide it via the user interface module 460 to the asset administrator.

In some embodiments, the analysis provided by one or more of the analytic services 440, 450 may not be provided to the asset administrator directly or immediately, and may be stored for later use. Further, in some embodiments, the analytic information may never be provided to a human user. This may occur, for example, in situations where computers in the monitored environment are capable of reviewing analytic information and adapting accordingly (e.g., by modifying software usage automatically) without user intervention.

There are many different types of analytic services that could be used as shown in FIG. 4. An example is provided herein using a licensing compliance situation. In this example, an asset administrator may desire to locate analytic services that can be used for license compliance modeling. In some embodiments, this may occur where the software asset management tool 400 is not adapted for providing licensing compliance analytic information; in other embodiments, this may occur in instances where supplemental license compliance models are sought (e.g., where the software asset management tool has built in license compliance tools, but other models are available from other sources).

In this example, the asset administrator may determine that the current licensing model used by a company is unsuitable or at least the asset administrator may want to know whether a better licensing model could be used. Using a computer, the asset administrator may indicate (via user interface module 460) that the company's asset management software (software asset management tool 400) should provide new licensing models for review. Based on the criteria set by the asset administrator, the computer searches (in analytic service database 410 using search module 402) for analytic services related to license modeling for software assets used by the company. The search reveals the definitions of two analytic services (analytic services 440 and 450) that provide licensing models that are different from each other (i.e., rely on different collected metrics) and are different from the model currently used by the company.

The information about the two licensing models may be used to collect the required metrics (by providing the definitions obtained by the search module 402 to the coordination module 403, which, in turn, instructs the metric collection module 404 on the metrics to be collected). In this example, one of the license models (e.g., the model provided by analytic service 450) requires metrics about average revenue generation in the company's business sector. Because this information is not available in the company's records (i.e., within monitored environment 420), the revenue generation metrics are instead collected from a vendor (third-party database 430). The remaining metrics are collected from the monitored environment (by metric collection module 404) based on the discovered software instances. All of the relevant metrics may then be stored (in metrics database 405). At the designated intervals, the asset administrator's computer provides the collected metrics to the two analytic services (via metric distribution module 406 relying on instructions from coordination module 403 and data from metrics database 405). Each analytic service may then apply the metrics that it receives to a licensing model and provide the completed license model to the asset administrator (via user interface module 460). Based on this review of the new license models, the asset administrator can determine how best to proceed and whether switching to a different licensing model is a good choice for the company.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
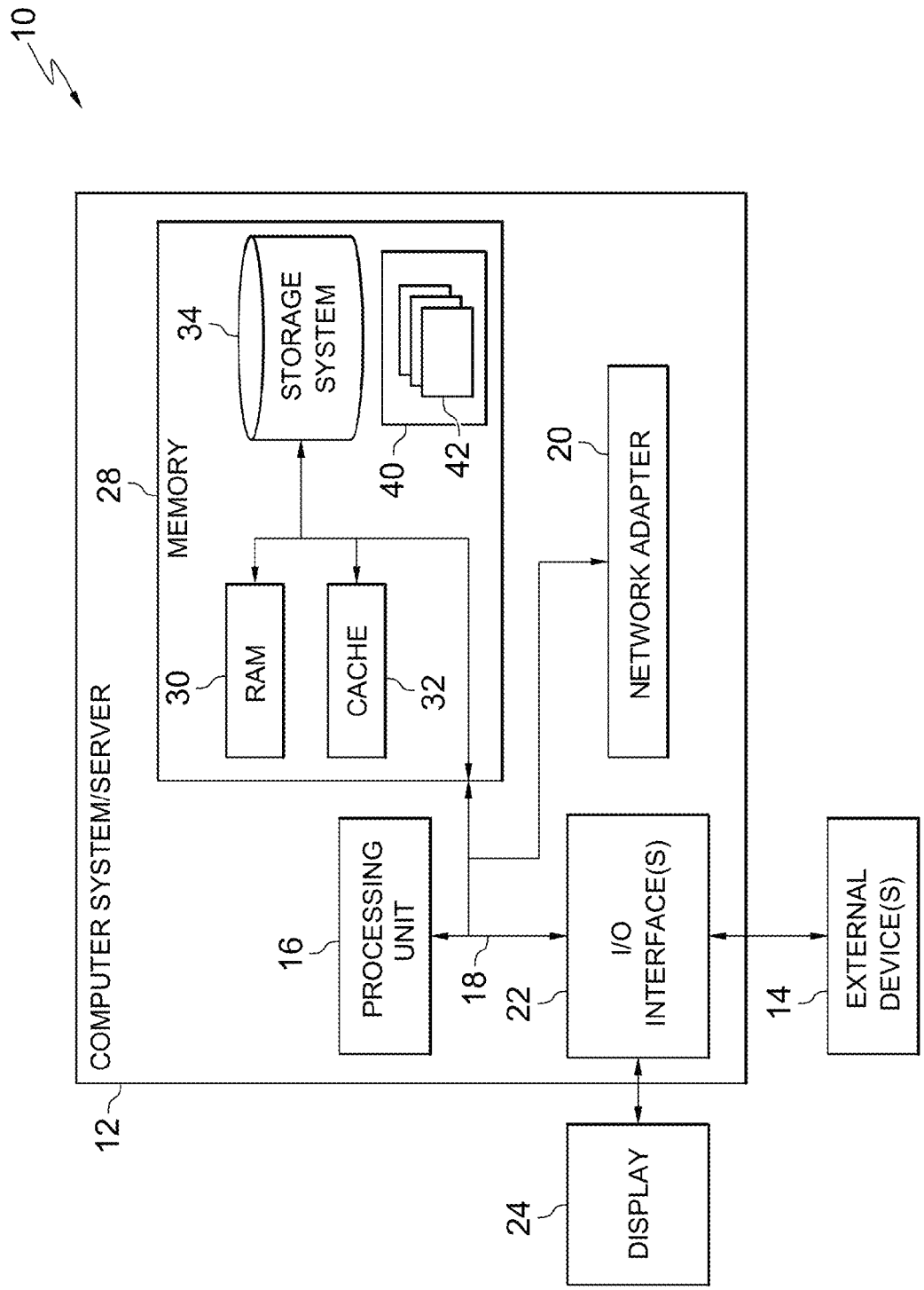
FIG. 5 illustrates a diagram of a cloud computing node, in accordance with embodiments of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
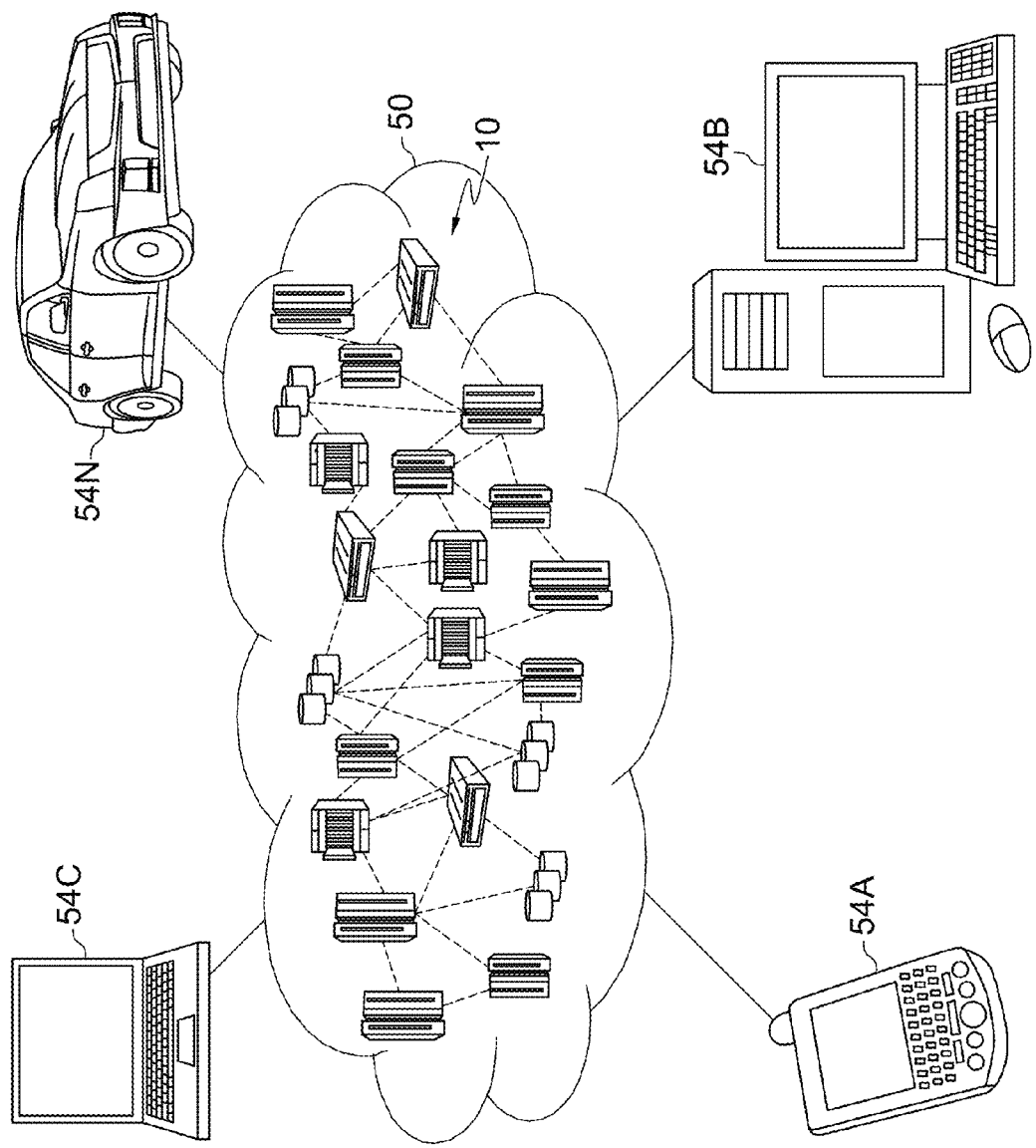
FIG. 6 illustrates a diagram of a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
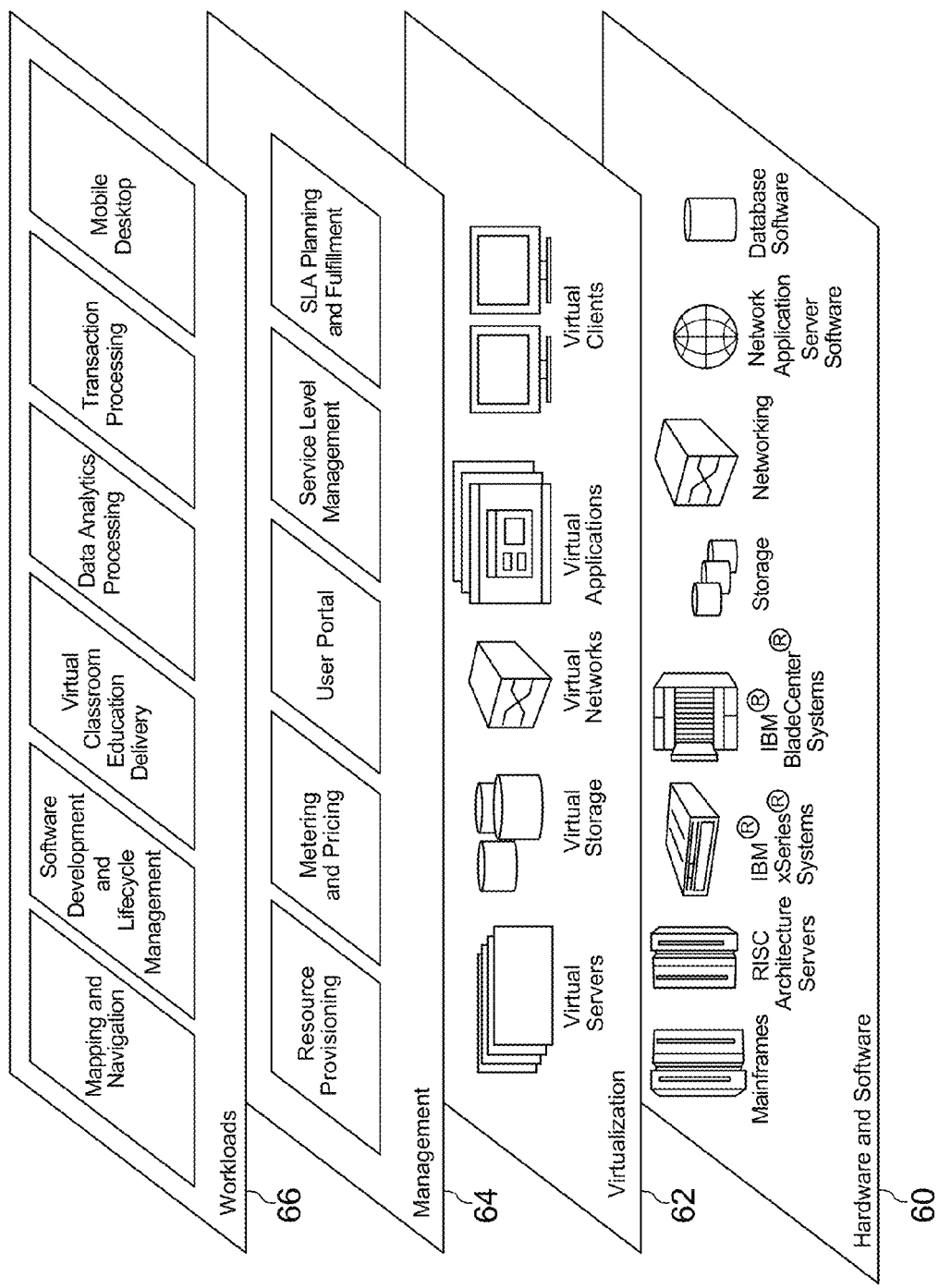
FIG. 7 illustrates a diagram of abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients. Various aspects of the present disclosure are directed toward monitoring the status of deployment components within the virtualization layer 62 using deployment patterns, as discussed in more detail herein.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In some embodiments, such metering and pricing functions may comprise generating software license compliance analytic information or collecting metrics and obtaining analytic information from one or more analytic services. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA)

planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
  a computer configured to:
    discover a plurality of software instances deployed in a monitored environment;
    collect metrics associated with the plurality of software instances;
    review a definition of a first analytic service adapted to generate analytic information about the plurality of software instances by using at least the collected metrics, the definition including a list of metrics used by the first analytic service to generate the analytic information, the list of metrics including the collected metrics and at least one context metric, wherein the at least one context metric is not available in the monitored environment prior to the discovering the first analytic service;
    based on the review of the definition, collect the at least one context metric from a third-party database remote from the monitored environment;
    provide the at least one context metric to the first analytic service;
    provide the collected metrics to the first analytic service; and
    obtain the analytic information from the first analytic service.

2. The system of claim 1, wherein the analytic service is deployed outside of the monitored environment.

3. A computer program product comprising a computer readable storage medium having program instructions embodied therewith, the program instructions executable by a computer to cause the computer to perform a method comprising:
  discovering a plurality of software instances deployed in a monitored environment;
  collecting metrics associated with the plurality of software instances;
  identifying a definition of an analytic service, wherein the analytic service is adapted to generate analytic information about the plurality of software instances by using at least the collected metrics, and wherein the definition includes a list of metrics used by the analytic service to generate the analytic information, the list of metrics including the collected metrics and at least one additional metric;
  collecting, based on the identified definition, the at least one additional metric;
  providing the collected metrics and the at least one additional metric to the analytic service; and
  obtaining the analytic information from the analytic service.

4. The computer program product of claim 3, wherein the method further comprises:
  querying an analytic service database listing a plurality of analytic services; and
  discovering, based on the query, the analytic service.

5. The computer program product of claim 3, wherein the method further comprises:
  based on the identified definition, obtaining at least one collection plug-in adapted for collecting the at least one additional metric.

6. The computer program product of claim 3, wherein the collecting metrics associated with the plurality of software instances is performed prior to the identifying the definition of the analytic service.

7. The computer program product of claim 3, wherein the at least one additional metric is an at least one context metric that is not available in the monitored environment prior to the identifying the definition of the analytic service, and wherein the method further comprises:
  based on the identified definition, collecting the at least one context metric from a third-party database remote from the monitored environment; and
  providing the at least one context metric to the analytic service.

8. A computer program product comprising a computer readable storage medium having program instructions embodied therewith, the program instructions executable by a computer to cause the computer to perform a method comprising:
  discovering a plurality of software instances deployed in a monitored environment;
  collecting metrics associated with the plurality of software instances;
  analyzing at least a portion of the collected metrics;
  based on the analysis, generating license compliance analytic information about at least one of the plurality of software instances;
  providing the collected metrics to an analytic service adapted to generate analytic information about the plurality of software instances by using at least the collected metrics; and
  obtaining the analytic information from the analytic service, wherein the analyzing at least a portion of the collected metrics, the generating the license compliance analytic information about at least one of the plurality of software instances, and the collecting the metrics associated with the plurality of software instances are performed by a software asset management tool, and wherein the software asset management tool is not adapted for generating the analytic information obtained from the analytic service.

* * * * *